(12) United States Patent
Landry et al.

(10) Patent No.: US 7,713,590 B2
(45) Date of Patent: May 11, 2010

(54) PHOTOLUMINESCENT COATING FORMULATION, METHOD OF APPLICATION, AND COATED ARTICLES

(75) Inventors: Kimberley Ann Landry, Coquitlam (CA); Scott G. Bullis, Victoria (CA); David W. Lewis, San Francisco, CA (US)

(73) Assignee: ARA Safety, Inc., Vancouver (CA)

( * ) Notice: Subject to any disclaimer, the term of this patent is extended or adjusted under 35 U.S.C. 154(b) by 1445 days.

(21) Appl. No.: 10/932,321

(22) Filed: Sep. 2, 2004

(65) Prior Publication Data

US 2006/0046093 A1    Mar. 2, 2006

(51) Int. Cl.
*B05D 5/06*  (2006.01)
*B05D 1/06*  (2006.01)

(52) U.S. Cl. .................. 427/470; 427/66; 427/475; 427/314

(58) Field of Classification Search ............... 427/66, 427/470, 475, 314
See application file for complete search history.

(56) References Cited

U.S. PATENT DOCUMENTS

| | | | |
|---|---|---|---|
| 4,208,300 A | 6/1980 | Gravisse | |
| 4,308,186 A * | 12/1981 | Schreurs et al. | 524/389 |
| 4,981,314 A | 1/1991 | Carr | |
| 4,998,391 A | 3/1991 | Connew | |
| 5,008,551 A | 4/1991 | Randolph | |
| 5,019,748 A * | 5/1991 | Appelberg | 315/169.3 |
| 5,396,740 A | 3/1995 | Bocchi | |
| 5,415,911 A | 5/1995 | Zampa et al. | |
| 5,724,909 A | 3/1998 | Pitman et al. | |
| 5,873,187 A | 2/1999 | Kozak et al. | |
| 5,904,017 A | 5/1999 | Glatz et al. | |
| 5,961,072 A | 10/1999 | Bodle | |
| 6,237,266 B1 | 5/2001 | Tassey et al. | |
| 6,279,180 B1 | 8/2001 | Bell et al. | |
| 6,487,802 B2 | 12/2002 | Suen | |
| 6,569,786 B1 | 5/2003 | Marsh | |
| 6,599,444 B2 | 7/2003 | Burnell-Jones | |
| 6,656,566 B1 | 12/2003 | Kuykendall et al. | |
| 6,726,952 B1 | 4/2004 | Dimond et al. | |
| 2003/0129297 A1 * | 7/2003 | Jakobi et al. | 427/66 |
| 2004/0126567 A1 | 7/2004 | Dimond et al. | |

FOREIGN PATENT DOCUMENTS

| | | |
|---|---|---|
| CA | 2311454 | 6/1999 |
| WO | WO 99/27294 | 6/1999 |

OTHER PUBLICATIONS

Powder Coating The Complete Finishers Handbook, Ed. by N.P. Liberto, 1994 pp. 1-2.*

* cited by examiner

*Primary Examiner*—Frederick J Parker
(74) *Attorney, Agent, or Firm*—Kolisch Hartwell, P.C.

(57) ABSTRACT

A formulation for a high performance Photoluminescent powder coat and a process by which a substrate is covered with multiple layers to give both photoluminescent and other advantageous qualities to said substrate. The first layer applied to the substrate is a retroreflective layer to provide retroreflective action to the second photoluminescent layer. A variety of translucent layers can then be applied over the photoluminescent layer to give such properties as antibacterial or antimicrobial action, non-slip surface or durability, and special textures. The layers can also provide such advantageous qualities as temperature resistance and electroconductivity or electrodissipation. Although this process has a variety of applications, it gives specific advantage to all forms of door hardware, both providing illumination for low-light conditions and advanced qualities such as heat or flame resistance.

15 Claims, No Drawings

PHOTOLUMINESCENT COATING FORMULATION, METHOD OF APPLICATION, AND COATED ARTICLES

FIELD OF THE INVENTION

The present invention generally relates to a Photoluminescent powder coat formulation, and a process by which advantageous properties, including photoluminescent properties, may be added to a substrate by applying a series of coats or layers through a modified powder coating process.

BACKGROUND OF THE INVENTION

Photoluminescent materials absorb and store light energy when they are illuminated by visible light or invisible electromagnetic (EM) radiation (such as ultraviolet or infrared EM radiation) from an excitation source of illumination, and then reradiate the stored energy as visible or invisible light.

Building codes and regulations for passenger transportation systems (ships, vehicles, trains, trams, airplanes, and the like), mines, and other spaces require that exit routes be lighted continuously during occupation to permit safe egress at all times. Backup power sources such as batteries and petroleum-fueled generators are usually employed to ensure these requirements are met when normal power fails. These systems do not necessarily ensure that occupants will be able to see the way out if the normal building or passenger transportation system (e.g. in the case of a ship or airplane) when power is interrupted. For example, fire or explosions can damage a centrally located power source, related distribution and transfer systems, and fuel storage. Batteries can fail as they expire over a period of time. Effective emergency lighting systems are expensive to purchase, install and to maintain, requiring maintenance and management practices that are not always implemented. When emergency lighting systems fail, building or vessel evacuation plans are jeopardized. This can contribute to panic and loss of life, and physical and psychological injury.

Alternative and supplemental methods of emergency lighting include linear path marking systems that are designed to overcome some of the above problems. Linear path marking systems involve narrow lengths of light sources attached to the walls, floors, and/or other architectural features of evacuation routes so that, in darkness, the path to safety is clearly and visibly marked. They can include photoluminescent pigments that store energy when they are illuminated by visible or invisible (i.e. ultraviolet or infrared) external light from an excitation source of illumination and then release it as visible light, in decreasing intensity over a period of time during subsequent darkness.

Photoluminescent pigment paint has been sprayed onto durable substrate surfaces, but once the pigment is applied it often must be polished in order to meet aesthetic requirements. This results in considerable waste during this spraying and subsequent grinding process. In addition, solvents potentially including VOCs (Volatile Organic Compounds) are used in paints, and the spraying process releases significant amounts of pollutants into the environment. Further, paints have comparatively poor durability and tend to flake and scratch over time, especially in heavy use areas.

Photoluminescent pigment has been melted into channels cut into substrates, giving significant durability to the photoluminescent pigment for use in high-traffic areas (see, for example, U.S. Pat. No. 6,726,952). However, this requires special processing of said substrate with specific grooves or channels cut into the surface, therefore limiting the application of this process. In particular, this process cannot be applied to three-dimensional articles such as doorknobs, door closers, and the like.

In some cases, translucent tapes, paints, or add-on polymers or plastics may be applied to existing articles with photoluminescent properties in order to add some advantageous qualities such as non-slip surfaces. However, not only do the surface additions negatively impact the luminescence of the photoluminescent layer, but the new layers tend to peel and flake and in general do not have good durability, especially for such high use applications such as hand rails or stair nosings. Furthermore, application of such tapes, paints, etc., to surfaces generally takes place on-site as opposed to during the manufacture of, for example, door handles and door push bars. Due to additional labor costs and inconvenience of on-site application it would be advantageous if photoluminescent properties could be applied to articles during the manufacturing process.

Especially in the case of door hardware, including but not limited to door knobs, handles, push bars, exit devices, door closers, frames, key card devices, keys, key cards, locks, and the door itself, there is no means of delivering high-quality photoluminescent product with other advantageous qualities that is ready for direct installation without further work at the time of installation. Currently a door or related door hardware would be installed then the photoluminescence added by tapes, paints, signs, or sometimes plastics. This adds time and expense to installing a door or door hardware with luminescence in low-lighting or emergency situations.

Further, US and international standards require that doors both be clearly marked for emergency and be able to withstand both fire and high heat. For example, doors must pass heat and fire exposure requirements of industry standards organizations such as UL (Underwriters Laboratories Inc.) in the United States. In the case of the United States, doors must withstand the tests in such standards as UL 10B "Standard for Fire Tests of Door Assemblies", and 10C "Standard for Positive Pressure Fire Tests of Door Assemblies".

There are further examples of prior art of building materials such as tiles or carpeting having photoluminescent qualities, and such photoluminescent materials may be used in original installation of a building. However, should these building materials become damaged or require retrofitting the process is extremely expensive since the entire section of the building material must be replaced. There are few effective mechanisms by which items may be retrofitted with high-quality photoluminescent product with further advantage of heat resistance or non-slip surfaces.

There exists no effective process in the prior art for applying durable photoluminescent coatings that meet both environmental and aesthetic requirements. Furthermore, there exists no process for applying such photoluminescent coatings that have additional desirable characteristics, such as antimicrobial characteristics, heat resistance, etc. Finally, there are no examples in the prior art for cost-effective retrofitting to add photoluminescence to existing installations as new laws requiring emergency lighting come into effect both in the United States and internationally.

Accordingly, it is the object of the present invention to provide a mechanism by which photoluminescent pigment is applied to a substrate. It is a further object of the present invention to provide means for applying photoluminescent coatings that overcomes the waste, durability, and pollution problems associated with prior art methods. It is a further object of the present invention to provided means for applying photoluminescent qualities to a broad range of two- and three-dimensional substrates. It is yet a further object of the present invention to provide means for making photoluminescent coated products that have both high aesthetic value and considerably higher durability than prior art surface applications such as tape, paint, or add-on plastics or polymers. It is an object of the present invention to provide means to apply, in addition to photoluminescent coating layers to substrates, additional layers having qualities such as, but not limited, antimicrobial properties or heat resistance. A further object of this invention is to provide cost-effective photoluminescent retrofitting with other advantageous qualities. In the case of doors, an object of this invention is to provide well-lit door and related hardware for emergency or low-light situations that pass a variety of fire and heat certifications.

SUMMARY OF THE INVENTION

According to a first aspect of the invention there is provided a method of applying multiple layers of powder coating, including a base layer, a photoluminescent layer, and a translucent layer. The method includes:
1. cleaning the substrate;
2. preparing a dry powder formulation for a retroreflective base layer, compounded with the appropriate additives such as curing agents or flow agents as required by the carrier material, to be applied to the substrate;
3. electrically grounding the substrate;
4. applying an electrostatic charge to the dry powder formulation while spraying it onto the substrate to form a retroreflective base layer;
5. heating the substrate and the retroreflective base layer to fuse it to the substrate;
6. preparing a dry powder formulation of photoluminescent pigment bonded with the appropriate translucent carrier including appropriate additives such as curing agents or flow agents as required by the carrier material to be applied as a photoluminescent layer over the retroreflective base layer;
7. electrically grounding and preheating the substrate with retroreflective base layer to enhance adhesion of the photoluminescent dry powder formulation;
8. applying an electrostatic charge to the photoluminescent dry powder formulation while spraying it onto the preheated substrate with base layer; the photoluminescent powder sticks to the preheated substrate with base powder layer to form a photoluminescent layer;
9. heating the substrate, base layer and photoluminescent layer to fuse the photoluminescent layer to the base powder layer;
10. preparing a translucent dry powder formulation, to be applied to the substrate with the base and photoluminescent layers;
11. electrically grounding and preheating the substrate with base and photoluminescent layers;
12. applying an electrostatic charge to the translucent dry powder while spraying it onto the substrate with the base and photoluminescent layers to form a translucent layer; the translucent layer adheres uniformly to the preheated substrate with the base powder and second photoluminescent layer;
13. heating the coated substrate to fuse the substrate, base layer, photoluminescent layer, and translucent layer.

In one embodiment of the present invention, the coated substrate has only two coating layers, a base layer and a photoluminescent layer.

In one embodiment of the present invention, the coated substrate has multiple coating layers, a base layer and a number of photoluminescent layers.

In another embodiment of the present invention, the substrate may have three or more coating layers, inclusive of the base and photoluminescent layer or layers. The third and subsequent layers may have other advantageous properties, although each layer above the photoluminescent layer or layers must be translucent so as not to interfere with the photoluminescent qualities of the photoluminescent layer.

In a further embodiment of the present invention, the second and third layers may include photoluminescent and other compounds having such advantageous qualities as antimicrobial and/or antibacterial properties, non-slip, temperature resistance, abrasion resistance, chemical resistance, acid resistance, salt or corrosion resistance, gloss modifiers from matt to high gloss, ultraviolet light resistance, anti-graffiti, electroconductivity, and electrodissipation.

In yet a further embodiment of the present invention, the substrate may be any two- or three-dimensional object and may be made of any metallic or non-metallic substance, including, but not limited to, wood, ceramic, glass, fabric, and the like, provided that the substance can withstand the temperatures and other conditions of the process.

In one embodiment of the present invention, the photoluminescent layer or layers may have anywhere from 1% to 80% photoluminescent pigment by weight bonded with the appropriate translucent carrier and appropriate additives such as curing agents or flow agents as required by the carrier material. In the preferred embodiment of the present invention the photoluminescent layer or layers contains photoluminescent pigment totaling between 30% and 70% of the final powder coat by weight bonded with the appropriate translucent carrier and appropriate additives such as curing agents or flow agents as required by the carrier material.

In a further alternative embodiment of the present invention, all layers will use a carrier and appropriate additives that have resistance to temperatures in excess of 1,000 F.

In addition, the final translucent layer may have electrodissipative or electroconductive properties. In this instance, all layers may, but are not required to, have the additive that lends electrodissipative or electroconductive properties to ensure that the entire item is fully electrodissipative or electroconductive.

In a further alternative embodiment of the present invention, any or all of the powder formulations of the various layers may be of the thermoset variety. A thermoset powder coat chemically crosslinks within itself and other additives and by this reaction forms a final compound of much higher molecular weight than the original compounds. Upon setting, this thermoset layer is heat stable and will not soften back to liquid when heat is reapplied. Alternatively, any or all of the powder coats may be thermoplastic. Final thermoplastic layers may revert to liquid form upon application of heat, easing the repair of blemishes in the coat by simple reheating to obtain uniformity.

In further embodiments of the present invention, any or all layers may be applied to the substrate or to previous layers with the electrostatic spray process, fluidized bed process, electrostatic fluidized bed process, or powder curing process.

In a further embodiment of the present invention, depending on the number of layers applied to the substrate and the thicknesses of the layers, the electrostatic charge of the powders may provide little or no attraction between the powder particles and the substrate. Accordingly, the grounding of the substrate and the application of electrostatic charge to the powder may be dispensed with. In such an instance the powder is simply sprayed onto the substrate and the heat of the substrate causes the powder particles to stick to and fuse to the surface of the substrate.

In one embodiment of the present invention, the disclosed process is applied to a door and related door hardware such as, but not limited to, door knobs, handles, push bars, exit devices, door closers, frames, key card devices, keys, key cards, locks, and the door itself. Further, in the case of the entire door being coated with one or more layers of photoluminescent pigment, the door becomes not only an exit indicator but a source of lighting in emergency situations that enables persons to see adequately to navigate obstacles that may be around the door itself.

In one embodiment of the present invention, when the disclosed process is applied to door and related door hardware, the final product will pass stringent fire and heat standards as set out by Underwriters Laboratories, Inc., in the USA. Powder coat has special heat and fire resistance properties that allow it to pass such standards as UL 10B "Standard for Fire Tests of Door Assemblies", and 10C "Standard for Positive Pressure Fire Tests of Door Assemblies".

In one embodiment of the present invention, an electroconductive additive is added to each layer of powder coating to ensure that electrostatic charge passes through all layers of powder coating. This ensures that the electrostatic attraction is uniform for each powder coat layer.

DETAILED DESCRIPTION OF INVENTION

Before describing the embodiments of the present invention, it must be understood that said invention is not limited to the specific details herein disclosed. Despite the present invention being described with reference to these preferred embodiments, it will be apparent to one skilled in the art that modifications and variations may be made which remain within the scope of the invention. Therefore the terminology herein is descriptive rather than limiting.

For the purpose of this application, the term "photoluminescent" refers to any material that absorbs and stores energy when illuminated by visible or invisible (e.g. ultraviolet or infrared) light and that later reradiates the stored energy as visible or invisible light. Several examples of photoluminescent chemicals include zinc sulphide and strontium aluminate. Photoluminescent materials are particularly useful in applications in which there are no sources of natural light or electrical power during emergency situations. They are used in commercial, industrial, and transportation environments for identifying emergency escape routes and danger areas, (such as stairs and doors) and for marking equipment, pipes, tools, fire equipment (such as fire hoses and extinguishers), and clothing for work or accident prevention.

The invention provides for a method of applying multiple layers to a substrate, inclusive of a base retroreflective layer, one or more photoluminescent layers, and one or more top translucent layers. The photoluminescent layer or layers, when stimulated by light, remain visible for a period of time after the light source is removed. Optional third and further layers may add valuable qualities to the substrate such as antimicrobial and/or antibacterial properties, non-slip, temperature resistance, abrasion resistance, chemical resistance, acid resistance, salt or corrosion resistance, gloss modifiers from matt to high gloss, ultraviolet light resistance, antigraffiti, electroconductivity, and electrodissipation. The end-result is a substrate that remains visible in low light and emergency situations with further qualities, which significantly improve the value of the original substrate. Substrates include, but are not limited to, metal, wood, glass, fabric, plastic, rubber, and ceramic. Applications include, but are not limited to, emergency egress markers, all forms of door hardware from knobs to handles to closers to frames to the door itself, valve wheels, protective clothing, stair nosing, hand rails, roadway signs, and novelty items such as yo-yos.

The process involves applying multiple coats to a substrate material in a modified powder coating process. Powder coating contains no solvent, and thereby the process emits negligible, if any, polluting volatile organic compounds (VOCs) into the atmosphere. Furthermore, the processes used for powder coating do not require venting, filtering, or solvent recovery as is necessary with liquid finishing. Electrostatic attraction, such as that used for example in the electrostatic powder coating process, works extremely well for a single layer of powder coat. However, it becomes less reliable in a multiple layer process because the electrostatic attraction between the powders and the substrate can diminish to zero, leaving uneven powder coat layers. The present invention discloses a method by which heat is applied to a substrate with previously layered powder coats to provide the extra stickiness required to allow further powder coats to adhere effectively and evenly.

Stage 1

The first stage involves the powder coating of the substrate with a base layer. The substrate must be cleaned through any of a number of known chemical or electrochemical cleaning processes appropriate for the substrate at hand. Note that different cleaning processes will be applied for metals versus plastics versus ceramics, and that from the point of view of this process it is understood that the person cleaning the substrate is well enough skilled in the art to clean the substrate appropriately.

An opaque dry powder formulation with retroreflective qualities is compounded with the appropriate additives such as curing agents or flow agents as required by the carrier material. Preferably this retroreflective opaque dry powder formulation will be white, as white provides the best retroreflective background for photoluminescent reflection, although the formulation may be of any color.

The substrate is then electrically grounded. An electrostatic charge is applied to the retroreflective opaque dry powder formulation (i.e. the powder coat) while the retroreflective opaque dry powder formulation is sprayed over the substrate.

The electrostatically charged retroreflective opaque dry powder formulation clings to the substrate surface. In the preferred method a 1 to 3 ml thick coat is applied.

The substrate coated with the retroreflective opaque dry powder formulation is heated to the temperature required to cure the retroreflective opaque dry powder formulation to the substrate. Depending on the substance of which the substrate is constructed, as well as the duration of the curing step, the curing temperature may be anywhere from 100 degrees F. to over 400 degrees F.

Stage 2

A photoluminescent dry powder formulation is bonded with the appropriate translucent carrier and appropriate additives such as curing agents or flow agents as required by the carrier material. Preferably there will be a minimum of 1% photoluminescent pigment to a maximum of 80% photoluminescent pigment by weight bonded with translucent carrier material, along with appropriate additives such as curing agents or flow agents. The amount of photoluminescent pigment required is dependent on the photoluminescent requirements of the final product. The preferred method is 30% to 70% photoluminescent pigment by weight in a clear thermoset powder coat base. This provides the greatest balance of performance and value when trying to achieve a high performance product. It is possible to add a high quality photoluminescent pigment directly to a clear powder coating without bonding, although it becomes very difficult to control luminance of the final product as photoluminescent pigment loading can vary substantially. During bonding care must be taken to avoid damaging of the photoluminescent pigment through either mechanical or humidity damage.

The substrate coated with the retroreflective opaque dry powder formulation (i.e. the base powder layer) is preheated to between 200 and over 400 degrees F. The time and temperature of preheating will depend on the properties of both the substrate and the base powder layer. As further layers are applied to the electrically grounded substrate, the electrostatic attraction between the newly applied layers or powder coats and the substrate reduces; the application of heat to the substrate acts to provide the necessary stickiness for the photoluminescent powder layer or layers and further layers to adhere to the substrate.

Preferably the substrate with the base powder layer will remain at the appropriate heat from the heating and curing step of Stage 1. Preferably the substrate with the base powder layer will not cool between applications of the base powder layer and subsequent layers.

The photoluminescent dry powder formulation is electrically charged while being sprayed onto the base powder layer of the substrate and uniformly adheres to the surface of the base powder layer. The preferred method involves either one or two coats of the photoluminescent dry powder formulation with a combined thickness of between 8 and 16 ml. The thickness of this layer has a direct impact on the luminance of the final product. Thicker coatings will provide higher luminance values in properly bonded powder coatings although it quickly reaches a point of diminishing return. The operator may be required to alter the electrostatic charge for application of the photoluminescent and further layers.

The substrate with the base powder layer and the new photoluminescent layer is then heated to the temperature required to cure the photoluminescent layer to the substrate. Depending on the carrier material, the substance of which the substrate is constructed, as well as the duration of curing, this temperature may be anywhere from 200 degrees F. to over 450 degrees F.

Stage 3

A translucent dry powder formulation is compounded with the appropriate additives such as curing agents or flow agents as required by the carrier material. A wide variety of different powder coat formulations exist having a variety of antimicrobial and/or antibacterial properties, non-slip, temperature resistance, abrasion resistance, chemical resistance, acid resistance, salt or corrosion resistance, gloss modifiers from matt to high gloss, ultraviolet light resistance, anti-graffiti, electroconductivity, and electrodissipation characteristics. The amount and type of powder coat to be compounded with the appropriate additives is dependent on the requirements of the final photoluminescent coated product. In the cases where the final photoluminescent coated product requires qualities as electroconductivity, electrodissipation, and/or heat resistance, all layers, base layer, photoluminescent layer or layers and translucent layer, may require the carriers and appropriate additives that give those particular qualities.

The translucent dry powder formulation may exhibit more than one of the above-listed characteristics. For example, the translucent dry powder formulation may contain some antimicrobial additives and some non-slip additives mixed with the appropriate additives such as curing agents or flow agents as required by the carrier material to give a final coated product with the qualities of photoluminescence, antimicrobial, and non-slip.

The substrate with the base and photoluminescent layers is preheated to between 200 and over 400 degrees F. As discussed above, as further layers are applied to the electrically grounded substrate, electrostatic attraction reduces; the application of heat acts to provide the necessary stickiness for additional layers to adhere to the substrate.

Preferably, the substrate with the base and photoluminescent layers will remain at the appropriate heat from the heating and curing step of Stage 2. Preferably, the substrate with the base and photoluminescent layers will not cool between applications of the photoluminescent and translucent layers.

The translucent dry powder formulation is charged while being sprayed onto the photoluminescent layer of the substrate. The powder formulation uniformly attaches to the surface of the substrate.

The substrate with the base, photoluminescent and translucent layers is then heated to the temperature required to cure the translucent layer. Depending on the substance of which the substrate is constructed, this temperature may be anywhere from 200 degrees F. to over 450 degrees F.

Further photoluminescent properties may be achieved by adding more than one photoluminescent layer.

Further translucent powder coat layers with advantageous properties may be added to the substrate by repeating stage three as necessary. It is important to note, however, that many advantageous qualities, such as non-slip, are only useful if applied to the top layer, and so while it may technically be possible to add more layers to the substrate, this is in reality often impractical. However, it should not be inferred that the process mentioned herein is a three stage process only; the process is a minimum of two stages (i.e. Stage 1 and 2, providing a base layer and a photoluminescent layer) with no maximum number of stages.

Powder (i.e. retroreflective opaque dry powder formulation, photoluminescent dry powder formulation or translucent dry powder formulation) from any stage of this process that does not adhere to the substrate or to the underlying layer simply falls to the ground and may be reclaimed for later use. As with conventional powder coating, the present process achieves an extremely high utilization of product of over 90% with very little environmental impact since the compounds in general are chemically neutral (unlike solvents and the like found in paints).

Details of Photoluminescent Powder Coating

The preferred methodology has photoluminescent pigment size of 25 microns (0.98425 mils or 0.00098425 inches; 1 mil=$\frac{1}{1000}^{th}$ of an inch) on average, which is similar to most thermoset powder coat particle sizes. However, since photoluminescent particle sizes may vary up to 100 microns (about 4 mils or $\frac{4}{1000}^{ths}$ of an inch), a minimum smooth coat is the depth of the largest particle, or a minimum of 4 mils, with a preferred photoluminescent coating layer, or multiple photoluminescent layers, for a total of 8 to 16 mils. This has been found to give the best luminescent results in the end-product. Smaller photoluminescent particle sizes result in significantly lower luminescence values. Photoluminescent pigments with median particle sizes of larger than 50 microns are significantly more expensive and are more difficult to work with, without an increase in photoluminescent values that offset these problems.

Photoluminescent pigments may be incorporated into carriers (powder resins) using the traditional melt-mix procedure through an extruder, followed by pulverization/milling and classification/sieving. This traditional melt-mix processes can cause photoluminescent pigments to fragment, which results in lowered photoluminescent values. Accordingly, a preferred embodiment for working with photoluminescent pigment is a bonding process, in which powdered resin is heated to slightly above its softening point and mixed with the photoluminescent pigment. The photoluminescent pigment adheres with the tacky resin and is therefore considered to be a single unit. This process involves adhering photoluminescent pigment to powder coating particles, which prevents separation during application and recycling.

Bonding was selected over dry mixing because dry mixing has several disadvantages. Although careful dry mixing of photoluminescent pigment with powder coat does not damage the photoluminescent pigment, dry mixed photoluminescent powder coat is much more difficult to apply consistently to substrates and other layers because the base powder and photoluminescent pigment have both different particle sizes and electrical properties. This results in a greatly different charge acceptance, impacting the consistency of the coat on the substrate or previous layer. This is a particularly difficult issue in applications where high amounts of photoluminescent pigment by weight are required (35% by weight and higher). In addition, if the powder coat composition is not uniform with photoluminescent pigment and binding agent, powder coat that is oversprayed cannot be easily recycled; the photoluminescent pigment concentration differs from that of the virgin powder, and recovery becomes much more difficult. Non-bonded powder coat processes can be quite wasteful, greatly reducing the economic benefit of using powder coat as opposed to other non-powder coat processes.

A problem with photoluminescent powder coats, as well as with photoluminescent pigment in other substances such as paint, is that photoluminescent pigment tends to be heavier than other particles in the mixture, and hence it sinks by the force of gravity when the mixture is in a fluid state. The preferred methodology uses a strontium aluminate photoluminescent pigment which has a specific gravity of 3.0 to 3.9 which is significantly higher than standard Polyester thermoset resins which are typically in the range of 1.0 to 1.7. In order to ensure the maximum photoluminescent qualities in the final product, the photoluminescent pigment must remain evenly suspended throughout the final layer. Therefore, in a further embodiment of the photoluminescent powder coating, an anti-settling agent is part of the Photoluminescent powder coat mixture.

Details of Multiple Powder Coat Layers

Traditional electrostatic powder coating processes are extremely successful where only a single layer of powder coat is required. However, after a layer of powder coat is applied to a substrate, the previous powder coat layer insulates the substrate and thereby restricts electrostatic attraction and limits the efficacy of this process.

One embodiment of this application states that both electrostatic action and heat are applied to the coated substrate to provide stickiness for further layers of powder coat. The application of heat from 200 to over 400 degrees F., in addition to the electrostatic process, provides stickiness so that the powder coat may adhere uniformly to the substrate with previous powder coat layers.

However, another embodiment of the disclosed process has a slight amount of electroconductive material compounded or bonded with the other components of the powder coat. Ergo, because each layer is electroconductive further powder coat layers do not insulate against electrostatic action. This ensures that each layer of powder coat after the first is fully uniform by electrostatic action. In this disclosed process, the final layer may or may not include the electroconductive element, depending on if the final product is required to have electroconductive properties.

Although this disclosure explicitly discussed the electrostatic spray process of coating the substrate, it should be understood that any or all of the layers may be attached to the substrate or previous layers with any known powder coating process. These processes include, but may not be limited to, Electrostatic Spray, Fluidized Bed, Electrostatic Fluidized Bed, or Powder Curing.

Traditional electrostatic powder coating processes are extremely successful where only a single layer of powder coat is required. However, after a layer of powder coat is applied to a substrate, the previous powder coat layer insulates the substrate and thereby restricts electrostatic attraction and limits the efficacy of this process.

It will be apparent to anyone skilled in the art that the present invention may be adapted into an automated or semi-automated process. It should be understood that all applications of this method, and implications thereof, including automation, are protected under the methods disclosed herein.

No limitation is implied as to the type or size of the substrate. Substrates may be of any metal, ceramic, glass, plastic, fabric, wood, or any other material. Substrates may be two-dimensional, such as stairway nosings used to mark stairs with photoluminescence during emergency situations, or they may be three-dimensional, such as door handles, door closers, push bars, and hand rails.

No limitation is implied as to the final function of any substrate coated by this process. They may be UL approved road signs, door nosings or wall moldings to indicate egress in low-light situations, door hardware, hand rail hardware, lighting hardware, protective clothing for emergency staff, novelty fabrics, novelty items, or have any other final use.

Details of Multiple Powder Coats on Doors

Traditional applications of photoluminescence to door or door hardware are completed after the door or door hardware is sent to the end-user, at which time various tapes, paints, or plastics may be added to the door or door hardware. The disclosed process indicates a process by which any door or door hardware may be sent to the end-user as a photoluminescent final product with other advanced characteristics such as non-slip or antimicrobial.

Further, the use of powder coat, especially thermoset powder coat, in relation to doors gives especial advantage in fire or heat exposure, as powder coats, especially thermoset powder coats, have high fire and heat resistance. Final door or door hardware will pass stringent fire and heat standards as set out by Underwriters Laboratories, Inc., in the USA. Powder coat has special heat and fire resistance properties that allow it to pass such standards as UL 10B "Standard for Fire Tests of Door Assemblies" and 10C "Standard for Positive Pressure Fire Tests of Door Assemblies".

By adding photoluminescent powder coat during the manufacture process of such items as door knobs with their keys one may match the final color of the photoluminescent pigment. For example, each key will have the same photoluminescent pigment as the pigment which is on a specific lock or door knob, making it that much easier for the person to exit through the locked door under low light or emergency conditions. This further applies to key card holders and their related key cards, as well as any other locking/closing technologies.

Powder coating an entire door with photoluminescent pigment has the further advantage of providing not only indication of egress but enough lighting so that persons exiting through that door may navigate obstacles or dangerous circumstances.

While the present invention has been described as having a preferred method, the invention may be further modified within the spirit and the scope of this disclosure. Therefore this application covers any variations, uses, or adaptations, which use the invention's general principles. In addition, the application is intended to cover departures from the present disclosure, which come within known or customary practice in the art to which this invention pertains and which falls within the limits of the appended claims.

The invention claimed is:

1. A method of applying a photoluminescent coating to a substrate, comprising:
   a. providing a retroreflective opaque dry powder;
   b. electrically grounding said substrate;
   c. applying an electrostatic charge to said retroreflective opaque dry powder and spraying said retroreflective opaque dry powder onto said substrate to form a base layer thereon;
   d. heating said substrate with said base layer to cure said base layer to said substrate;
   e. providing a photoluminescent dry powder including a photoluminescent pigment and a resin;
   f. preheating and electrically grounding said substrate;
   g. applying an electrostatic charge to said photoluminescent dry powder and spraying said photoluminescent dry powder onto said preheated and electrically grounded substrate to form a photoluminescent layer over said base layer;
   h. heating said substrate to cure said photoluminescent layer to said base layer of said substrate.

2. The method of claim 1, further comprising the following steps:
   a. providing a translucent dry powder;
   b. preheating and electrically grounding said substrate;
   c. applying an electrostatic charge to said translucent dry powder and spraying said translucent dry powder onto said substrate to form a translucent layer over said photoluminescent layer; and
   d. heating said substrate to cure said translucent layer to said photoluminescent layer of said substrate.

3. The method of claim 1, wherein said substrate is a substantially non-planar object.

4. The method of claim 1, wherein said substrate is made of a material selected from the following group: metal, wood, ceramic, glass, and fabric.

5. The method of claim 1, wherein said photoluminescent dry powder contains between 1% and 80% photoluminescent pigment by weight.

6. The method of claim 1, wherein said photoluminescent dry powder contains between 30% and 70% photoluminescent pigment by weight.

7. The method of claim 1 or 2, wherein one or more of said layers contains further additives which confer one or more of antimicrobial, antibacterial, non-slip, temperature resistant, abrasion resistant, chemical resistant, acid resistant, salt resistant, corrosion resistant, glossy, matte, ultraviolet light resistant, anti-graffiti, electroconductive, and electrodissipative properties.

8. The method of claim 2, wherein said translucent layer contains an additive that confers electrodissipative properties.

9. The method of claim 1 or 2, wherein one or more of said layers comprises a thermoset.

10. The method of claim 1 or 2, wherein one or more of said layers comprises a thermoplastic.

11. The method of claim 1 or 2, wherein said substrate is an article selected from the following group: door knobs, handles, push bars, exit devices, door closers, frames, key card devices, keys, key cards, locks, and the door itself.

12. The method of claim 1, wherein said photoluminescent pigment is adhered to said resin.

13. The method of claim 1 or 2, wherein one or more of said retroreflective opaque dry powder, said photoluminescent dry powder and said translucent dry powder includes at least one agent selected from the group consisting of a flow agent and a curing agent.

14. The method of claim 1, wherein said photoluminescent pigment is adhered to at least one carrier selected from the group consisting of a polyester, a flow agent, and a curing agent.

15. A method of applying a photoluminescent coating to a substrate, comprising:
   a. applying a base layer to said substrate as a powder coat; and
   b. preheating said substrate to promote powder adhesion to said substrate; and
   c. applying a photoluminescent layer to said preheated substrate as a powder coat;
   wherein the term powder coat is understood to mean a powder coat applied by any one of Electrostatic Spray, Fluidized Bed, or Electrostatic Fluidized Bed methods; and
   wherein said photoluminescent layer is applied as a photoluminescent dry powder including a photoluminescent pigment and a resin.

* * * * *